May 31, 1949.　　　A. B. BOGLE　　　2,471,513
CONVEYER LOCKING AND ALIGNING SYSTEM
Filed Dec. 15, 1945　　　　　　　　　　　2 Sheets-Sheet 1
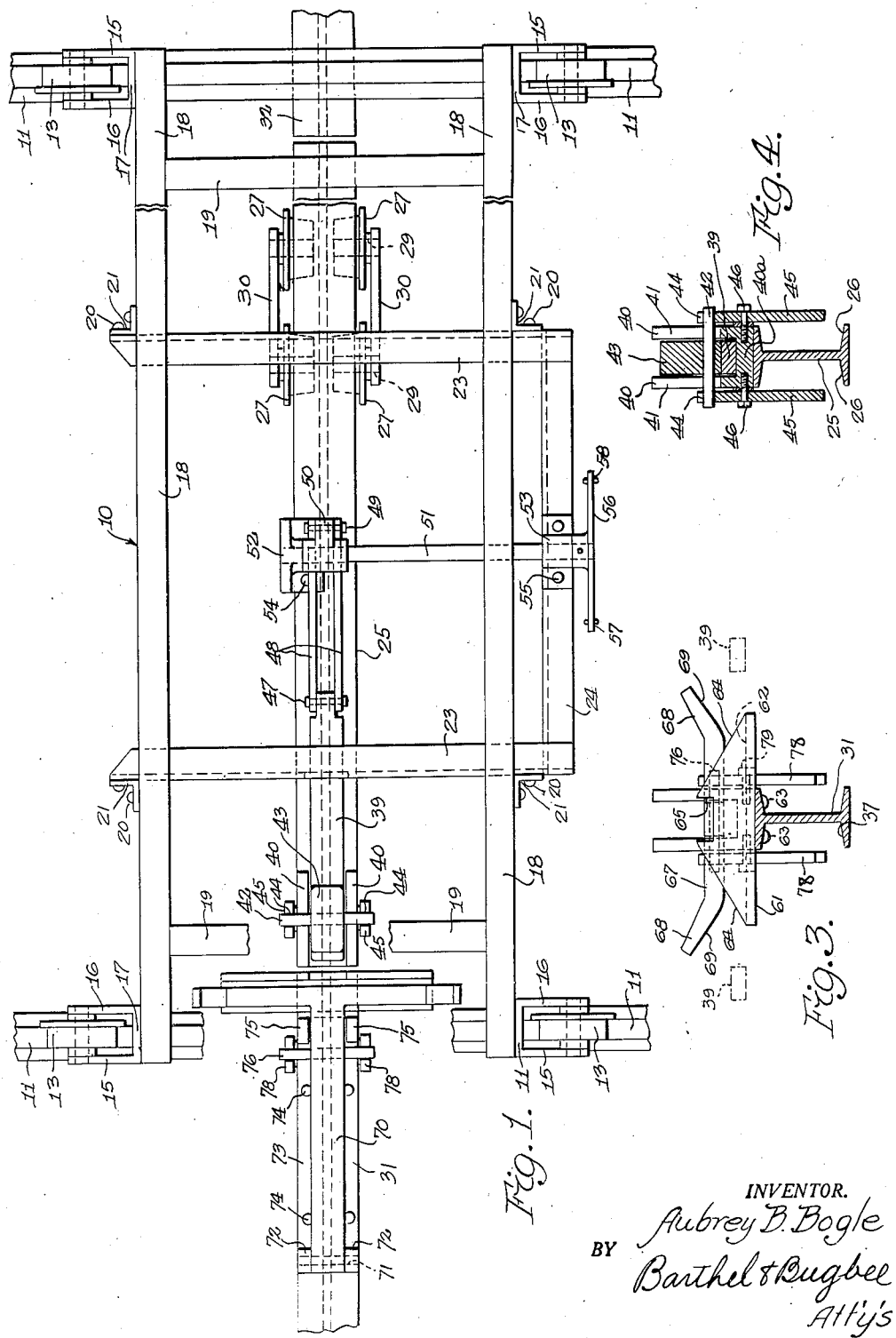
INVENTOR.
Aubrey B. Bogle
BY Barthel & Bugbee
Att'ys

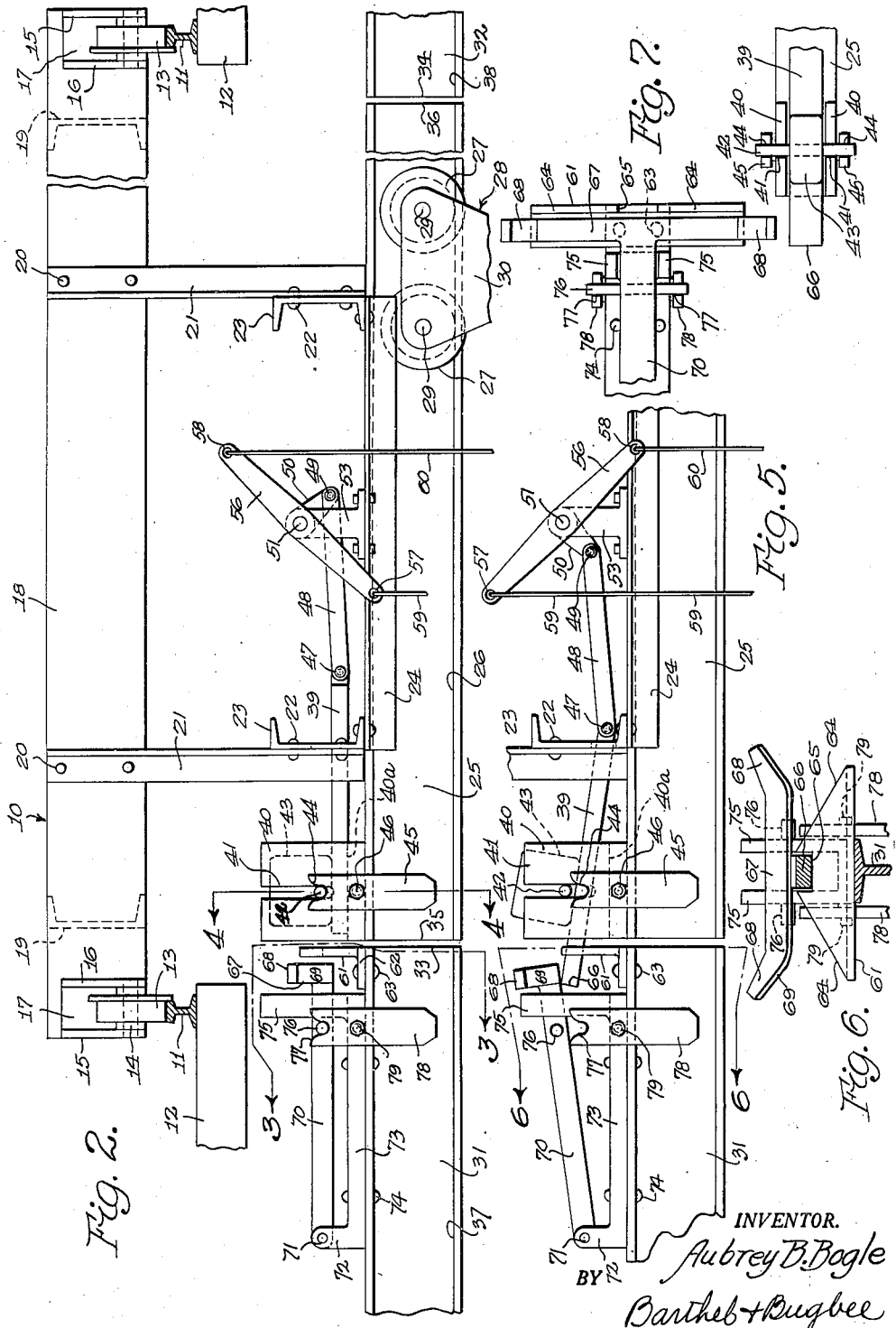

Patented May 31, 1949

2,471,513

UNITED STATES PATENT OFFICE 2,471,513

CONVEYER LOCKING AND ALIGNING SYSTEM

Aubrey B. Bogle, Highland Park, Mich.

Application December 15, 1945, Serial No. 635,240

4 Claims. (Cl. 104—98)

This invention relates to conveying systems such as traveling cranes, and in particular, to a locking mechanism for movable tracks which travel into and out of alignment with stationary tracks.

One object of this invention is to provide an improved aligning and locking mechanism for traveling conveyors or cranes having moving tracks cooperating with stationary tracks.

Another object is to provide an aligning and locking mechanism for traveling conveyors or cranes having cooperating moving and stationary tracks, which mechanism also operates latches for selectively preventing or permitting a trolley device to move from one track to another according to whether the moving track is in alignment or out of alignment with the stationary track.

Another object is to provide a manually set locking system which is automatically operative to lock a moving track when it moves into alignment with a stationary track.

Another object is to provide a locking system as set forth in the preceding object wherein the actuation of the locking system upon alignment of the tracks automatically releases latches upon either or both the stationary and moving track, these latches normally preventing a car or trolley upon one track from moving off that track.

Other objects and advantages will become apparent during the course of the following description of the accompanying drawings wherein:

Figure 1 is a top plan view partly broken away of a locking and aligning system for traveling conveyors or cranes according to a preferred form of the invention;

Figure 2 is a side elevation of the locking system shown in Figure 1 with the parts in their positions when the tracks are out of alignment;

Figure 3 is an end elevation looking in the direction 3—3 in Figure 2;

Figure 4 is a cross section along the line 4—4 of Figure 2;

Figure 5 is a fragmentary side elevation similar to Figure 2 but showing the parts in their positions when the tracks are locked in alignment;

Figure 6 is an end elevation partly in cross-section, looking in the direction 6—6 in Figure 5; and Figure 7 is a fragmentary top plan view similar to a portion of Figure 1 but showing the locking member extended prior to alignment of the tracks.

Referring to the drawings in detail, Figures 1 and 2 show a traveling conveyor such as an overhead travelling crane or carriage generally designated 10 mounted to travel upon rails 11 resting upon supports 12, such as the framework of a building. The carriage 10 is mounted on the rails 11 by means of flanged wheels 13 rotatably mounted upon axles 14 which in turn are supported between the side arms 15 and 16 of brackets 17 secured to cross members 18 preferably of channel cross-section. The cross members 18 are interconnected by braces 19 secured thereto as by welding or riveting.

Secured as at 20 to the cross members 18 and depending therefrom are vertical supports 21 of channel cross-section, the lower ends of which are secured as at 22 to transverse channel members 23 which in turn are interconnected by an angle member 24. Secured to and depending from the transverse members 23 is a track portion 25 having flanges 26 upon which the flanged wheels 27 of a car or trolley 28 travel to and fro. The wheels 27 are mounted upon axles 29 secured at one end in the side plates 30. The latter serve to support any suitable type of hoisting or conveying devices (not shown) such as a chain hoist, a basket, cradle or the like.

Cooperating with the moving track 25 are stationary tracks 31 and 32 supported in any suitable manner upon the building or its framework. The tracks 31 and 32 are positioned so that their ends 33 and 34 are in alignment with the opposite ends 35 and 36 respectively of the moving track 25 when the latter reaches a predetermined point. At that point, the flanges 37 and 38 of the stationary tracks 31 and 32 are likewise in alignment with the flanges 26 upon the movable track 25 so that the wheels 27 of the trolley 28 may roll between the tracks without undue jolting.

In order to insure alignment, the movable carriage 10 is provided with a locking plunger 39 reciprocable between guide plates 40 (Figure 4) interconnected by a base 40a mounted upon the end of the movable track 25. The guide plates 40 are provided with vertical slots 41 serving as vertical guideways to the opposite ends of a pin 42 passing through a weight 43. When the tracks 25 and 31 are unlocked and not in alignment, the pin 42 is urged by the weight 43 downwardly into notches 44 in the upper ends of swinging latches or detents 45 pivoted at 46 to the base 40a of the guide plates 40.

The rearward end of the locking plunger 39 is pivoted at 47 to the connecting rods 48 which in turn are pivoted at 49 to the cranks 50 mounted upon the crank shaft 51. The latter is supported at its opposite ends in journal brackets 52 and 53 secured as at 54 and 55 to the upper sides of the track 25 and angle member 24 respectively. Mounted on the outer end of the crank shaft 51 is a cross bar 56 having eyes 57 and 58 at its opposite ends to which are secured the control members 59 and 60. The lower ends of the control members 59 and 60, which may be either cables or rods, terminate in suitable handles (not shown). Accordingly, when the control member 59 is pulled downward (Figure 2), the locking plunger 39 is retracted, whereas when the control member 60 is pulled down (Figure 5), the locking plunger 39 is extended.

The stationary tracks 31 and 32 are provided with locking mechanism (only one being shown) cooperating with the locking mechanism mounted upon the traveling crane 10. The stationary locking mechanism includes a stationary cam member 61 having a base 62 secured as at 63 to the upper side of the track 31 and having inclined top guide portions 64 leading to a notch 65 (Figures 3 and 6). The notch 65 is of a size and shape adapted to serve as a locking notch for the outer end 66 of the locking plunger 39.

Cooperating with the cam member 61 in guiding the end 66 of the locking plunger 39 up the inclined guideway 64 into the notch 65 is a movable cam member 67 having upwardly angled ends 68 and a lower edge 69. The movable cam member 67 is secured to the outer end of an arm 70 pivoted as at 71 to the bearing bracket 72 having a base 73 secured as at 74 to the upper side of the track 31. The base 73 is provided with a pair of vertical guide plates 75 on opposite sides of the arm 70. Extending through and secured in the arm 70 is a pin 76 similar in purpose to the pin 42 and similarly having its opposite ends arranged to enter notches 77 in the upper ends of swinging latches or detents 78. The latches or detents 78 are similar to the latches or detents 45 and are pivoted as at 79 to the base 73.

In the operation of the invention, let it be assumed that the travelling carriage 10 is approaching alignment of its track 25 with the stationary tracks 31 and 32. The operator now pulls down the control member 60, thereby extending the outer end 66 of the locking plunger 39 into the path of the cam member 61 (Figure 7). As the carriage 10 and its track 25 approach the cam member 61, the end 66 of the locking plunger 39 encounters and ascends one of the inclined portions 64 to the top thereof and drops into the notch 65, contact being maintained with it by the edge 69 on the lower side of the movable cam member 67. As the end 66 of the locking plunger 39 ascends the incline 64 of the stationary cam member 61, the movable cam member 67 rises, lifting the arm 70 and consequently lifting the pin 76 out of the notches 77 in the latches or detents 78 (Figure 6). This action frees the latches or detents 78 to swing in either direction.

Meanwhile, the rising of the locking plunger 39 (Figure 6) due to its ascending the incline 64, raises the weight 43 and consequently lifts the pin 42 out of the notches 44 in the latches or detents 45, likewise freeing the latter to swing in either direction. As a consequence, when the tracks 31 and 25 are brought into alignment and locked by the plunger 39 falling into the notch 65, there follows the unlatching of the latches or detents 45, likewise freeing the latter to swing in either direction. As a consequence, when the tracks 31 and 25 are brought into alignment and locked by the plunger 39 falling into the notch 65, there follows the unlatching of the latches or detents 78 and 45 permitting the wheels 27 of a trolley device 28 to travel freely in either direction between the rails 25 and 31, pushing the latches or detents 45 and 78 out of the way. At other times, however, when the tracks 25 and 31 are out of alignment, the latches or detents 45 and 78 are securely latched by the pins 42 and 76 in the notches 44 and 77 (Figure 2) so that the trolley member 28 cannot move either off the movable track 25 or off the stationary track 31, whichever it happens to be on at the time.

Thus, the present invention provides a safety aligning and locking mechanism for a track which is movable into and out of alignment with a stationary track. At the same time, it also provides a latching or detent mechanism whereby a car or trolley is prevented from moving off the end of either the movable or stationary track except when the two are properly aligned and locked. Furthermore, the latching and unlatching actions are accomplished automatically in response to the operation of the locking and aligning mechanism.

While I have shown and described my invention in detail, it is to be understood that the same is to be limited only by the appended claims, for many changes may be made without departing from the spirit and scope of my invention.

What I claim is:

1. A safety aligning and stop mechanism for trolleys traveling on relatively movable tracks comprising a trolley stop pivotally mounted near the end of one track and arranged to swing into and out of stopping relationship with said trolley, a latching member movable into and out of latching engagement with said stop, a locking bolt reciprocably mounted on one of said tracks, a keeper mounted on the other of said tracks and having a bolt recess and an inclined cam portion, said cam portion being operative simultaneously to lift said bolt upward into said recess in response to the relative motion of said tracks into alignment and also to move said latching member out of latching engagement with said stop whereby to release said stop and permit travel of said trolley from one track to the other.

2. A safety aligning and stop mechanism for trolleys traveling on relatively movable tracks comprising a trolley stop pivotally mounted near the end of one track and arranged to swing into and out of stopping relationship with said trolley, a latching member movable into and out of latching engagement with said stop, a locking bolt reciprocably mounted on one of said tracks, a keeper mounted on the other of said tracks and having a bolt recess and an inclined cam portion, said cam portion being operative simultaneously to lift said bolt upward into said recess in response to the relative motion of said tracks into alignment and also to move said latching member out of latching engagement with said stop whereby to release said stop and permit travel of said trolley from one track to the other, said stop having a latching recess therein and said latching member having a latching projection movable out of said recess in response to the lifting of said bolt.

3. A safety aligning and stop mechanism for trolleys traveling on relatively movable tracks comprising a trolley stop pivotally mounted near the end of one track and arranged to swing into and out of stopping relationship with said trolley, a latching member movable into and out of latching engagement with said stop, a locking bolt reciprocably mounted on one of said tracks, a keeper mounted on the other of said tracks and having a bolt recess and an inclined cam portion, said cam portion being operative simultaneously to lift said bolt upward into said recess in response to the relative motion of said tracks into alignment and also to move said latching member out of latching engagement with said stop whereby to release said stop and permit travel of said trolley from one track to the other, said stop having a latching recess therein and said latching member having a latching projection movable out of said recess in response to the lifting of said bolt, and also having a member yieldingly urging said projection into said latching recess.

4. A safety aligning and stop mechanism for trolleys traveling on relatively movable tracks comprising a trolley stop pivotally mounted near the end on one track and arranged to swing into and out of stopping relationship with said trolley, a latching member movable into and out of latching engagement with said stop, a locking bolt holder reciprocably mounted on one of said tracks, a locking bolt pivotally mounted on said bolt holder and extending beneath said latching member, a bolt reciprocator operatively connected to said bolt holder, a keeper mounted on the other of said tracks and having a bolt recess and an inclined cam portion, said cam portion being operative simultaneously to lift said bolt upward into said recess in response to the relative motion of said tracks into alignment and also to move said latching member out of latching engagement with said stop whereby to release said stop and permit travel of said trolley from one track to the other.

AUBREY B. BOGLE.

REFERENCES CITED

The following references are of record in the file of this patent:

UNITED STATES PATENTS

| Number | Name | Date |
| --- | --- | --- |
| 809,482 | Whittemore | Jan. 9, 1906 |
| 1,053,667 | Steedman | Feb. 18, 1913 |
| 1,117,545 | Beausejour | Nov. 17, 1914 |
| 1,150,003 | Focardi | Aug. 10, 1915 |
| 1,553,439 | Goldberg | Sept. 15, 1925 |
| 1,643,642 | Phillips | Sept. 27, 1927 |
| 1,841,454 | Robertson | Jan. 19, 1932 |
| 2,035,355 | Weise | Mar. 24, 1936 |